June 5, 1934.                H. M. GRIFFOUL                1,962,013
                              CHILD'S VEHICLE
                           Filed April 10, 1933
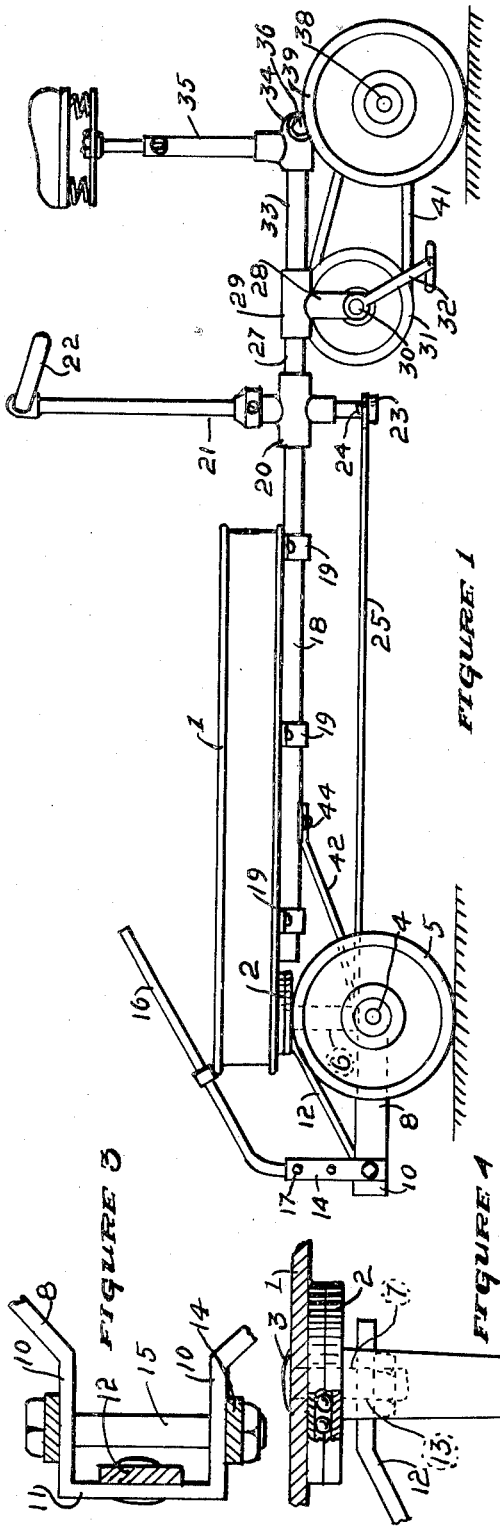
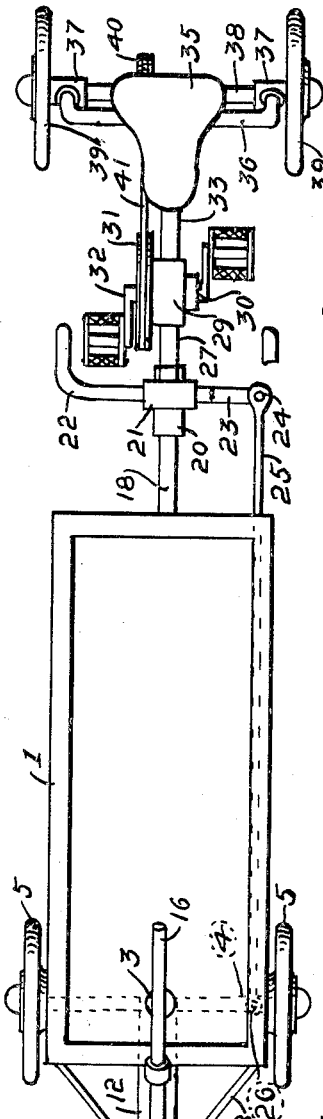
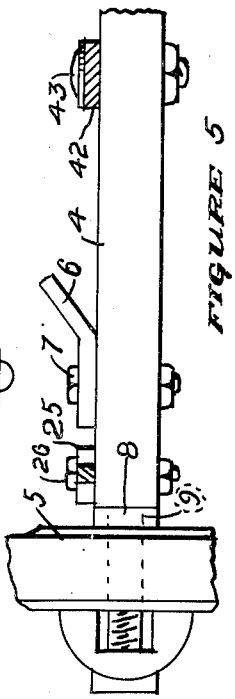
INVENTOR
Henry M. Griffoul
John A. Naismith
ATTORNEY Patented June 5, 1934

1,962,013

UNITED STATES PATENT OFFICE 1,962,013

CHILD'S VEHICLE

Henry M. Griffoul, San Jose, Calif.

Application April 10, 1933, Serial No. 665,346

1 Claim. (Cl. 208—113)

It is one object of the invention to provide a child's vehicle on which two or more children may ride, and which may be steered by either one of two occupants thereof.

It is another object of the invention to provide a device of the character indicated that may be propelled by one occupant and steered by another occupant thereof.

It is also an object of the invention to provide a vehicle combining certain operative features of a tricycle or bicycle and a wagon.

Finally, it is an object of the invention to provide a vehicle of the character indicated that will be economical to manufacture, simple in form and construction, light in weight, strong, durable, and highly efficient in its practical application.

In the drawing:

Figure 1 is a side elevation of a vehicle embodying my invention.

Figure 2 is a plan view of the same, a part being broken away.

Figure 3 is an enlarged section on 3—3 of Figure 1.

Figure 4 is an enlarged section on 4—4 of Figure 2, parts being broken away.

Figure 5 is an enlarged section on 5—5 of Figure 2, parts being broken away.

Referring now more particularly to the drawing, I show at 1 a wagon body having a fifth wheel mounted beneath its forward end as at 2, the king-bolt showing at 3.

The front axle is shown at 4 and is fitted with wheels 5, a brace 6 being mounted thereon as at 6 through which the bolt passes as indicated at 7.

At 8 is a bar having its two ends mounted on the axle ends as at 9 and extending angularly and forwardly therefrom with its central portion formed to provide a pair of parallel sections 10—10 and a front connecting section 11. A brace 12 is mounted on the section 11 and passes rearwardly and upwardly to engage the king bolt at 13. At 14 is an upstanding yoke having its arms secured to sections 10—10 by a bolt 15, and a steering bar 16 is secured to the yoke 14 at 17 and passes upwardly and rearwardly over the front end of the wagon body.

By means of this construction a child seated in the wagon body can grasp the steering bar 16 and by swinging it to the right or left adjust the wheels to travel in the direction desired.

A bar 18 is mounted upon the under side of the body 1 by means of straps 19, this bar lying along the longitudinal center line of the body and extending a distance rearwardly of the body, a bearing member 20 being mounted thereon as shown.

Passing through the bearing 20 is an upstanding steering post 21 fitted with a handle 22 and having a laterally directed arm 23 mounted on its lower end. Pivotally connected to the arm 23 at 24 is a link 25, the forward end of the link being pivotally connected to the axle 4 at 26.

Mounted in bearing member 20 is a short bar section 27 having a vertically disposed depending support 28 mounted thereon through the medium of a connector 29, and in the part 28 is mounted a horizontally disposed shaft 30 fitted with a sheave 31 and pedals 32.

A bar section 33 is mounted in the rear end of connector 29 in axial alignment with bar sections 18 and 27, and this bar is provided with a fitting 34 carrying a seat structure 35. Fitting 34 also has a cross bar or fork 36 mounted thereon, the two ends of the fork being provided with bearings 37 in which is mounted an axle 38 having wheels 39 mounted thereon. The axle 38 has a sheave 40 mounted thereon and the sheaves 31 and 40 are connected by a driving belt 41.

At 42 is a brace pivotally connected to axle 4 at 43 and secured to bar 18 at 44.

In the practical use of this vehicle it is propelled by one child mounted on the seat structure 35 and operating the pedals 32, while one, two, or even more children may be carried in the wagon body 1.

By means of the construction described the child propelling the vehicle may steer the same as desired through the medium of link 25, or if there is a child seated in the wagon body 1 it may steer the vehicle by manipulating handle 16, or the two children may control the movement of the vehicle by joint manipulation of the steering mechanisms.

It is to be understood of course, that while I have herein shown and described but one specific embodiment of the invention, changes in form, construction, and method of assembly and operation may be made within the scope of the appended claim.

I claim:

A child's vehicle comprising, in combination, a frame, a wagon body mounted on one end thereof and projecting beyond said end, steering wheels mounted on the projecting end of the body, steering gear for the wheels disposed in operative relation to the adjacent end of the body, drive wheels mounted on the end of the frame remote from the body, pedal actuated means for operating said wheels, a seat disposed on the frame above the drive wheels, a steering post mounted on the frame forwardly of the seat, and steering gear connecting the steering post and the steering wheels.

HENRY M. GRIFFOUL.